United States Patent
Sidorenko et al.

(10) Patent No.: US 6,583,284 B1
(45) Date of Patent: Jun. 24, 2003

(54) ANISOTROPIC FILMS BASED ON SULFODERIVATIVES OF PHENANTHRO-9', 10':2,3-QUINOXALINE AND LYOTROPIC LIQUID CRYSTAL SYSTEMS AND METHOD FOR MAKING

(75) Inventors: Elena N. Sidorenko, Moscow (RU); Tatiana Ya. Dutova, Moscow (RU)

(73) Assignee: Optiva, Inc., South San Francisco, CA (US)

( * ) Notice: Subject to any disclaimer, the term of this patent is extended or adjusted under 35 U.S.C. 154(b) by 0 days.

(21) Appl. No.: 10/300,422

(22) Filed: Nov. 19, 2002

Related U.S. Application Data

(60) Provisional application No. 60/402,026, filed on Aug. 7, 2002.

(51) Int. Cl.$^7$ .................... C07D 24/38; C09K 19/32
(52) U.S. Cl. .................... 544/342; 252/299.62; 349/1; 349/182
(58) Field of Search .................... 544/342; 252/299.62; 349/1, 182

(56) References Cited

U.S. PATENT DOCUMENTS

| | | | |
|---|---|---|---|
| 2,553,961 A | | 5/1951 | Dreyer |
| 5,959,107 A | * | 9/1999 | Ishiguro et al. ............. 544/284 |

FOREIGN PATENT DOCUMENTS

| | | |
|---|---|---|
| EP | 0 961 138 A1 | 12/1999 |
| EP | 1 128 192 A1 | 8/2001 |
| WO | WO 94/28073 | 12/1994 |

OTHER PUBLICATIONS

Bahadur, B., ed., "Liquid Crystals–Applications and Uses", vol. 1, World Scientific, Singapore, New York, Jul. 1990, pp. 100–103.

Lazarev, P., et al., "Thin Crystal Film Retarders", *Proc. of the 7$^{th}$ International Display Workshops, Materials and Components,* Kobe, Japan, Nov. 29–Dec. 1, 2000, pp. 1159–1160.

Lazarev, P., et al., "P–6: Submicron Thin Retardation Coating", *SID 01 DIGEST,* San Jose, California, Jun. 2001, vol. XXXII, pp. 571–573.

\* cited by examiner

*Primary Examiner*—Charanjit S. Aulakh
(74) *Attorney, Agent, or Firm*—Dorsey & Whitney LLP

(57) ABSTRACT

Anisotropic films based on sulforderivatives of phenanthro-9',10':2,3-quinoxaline are disclosed. These compounds form liquid crystal and lyotropic liquid crystal systems that exhibit excellent optical properties with films that are significantly thinner than the current state of the art. The liquid crystal systems may be deposited on substrates or other film materials for use in a wide variety of commercial applications.

41 Claims, 2 Drawing Sheets

ANISOTROPIC FILMS BASED ON SULFODERIVATIVES OF PHENANTHRO-9', 10':2,3-QUINOXALINE AND LYOTROPIC LIQUID CRYSTAL SYSTEMS AND METHOD FOR MAKING

RELATED APPLICATIONS

This application claims priority to U.S. Provisional Application Serial No. 60/402,026, filed on Aug. 7, 2002, the disclosure of which is hereby incorporated by reference in its entirety.

FIELD OF THE INVENTION

The present invention relates generally to the fields of organic chemistry and optically anisotropic coatings. More specifically, the present invention is related to methods of synthesizing heterocyclic sulphoderivative compounds and manufacturing optically anisotropic coatings based on these compounds.

BACKGROUND OF THE INVENTION

Modem technological progress requires development of optical elements based on new materials with specific, controllable properties. In particular, the necessary element in modem visual display systems is an optically anisotropic film that is optimized for the optical characteristics of an individual display module.

Various polymer materials are known in the prior art for use in the production of optically anisotropic films. Films based on these polymers acquire optical anisotropy through uniaxial extension and coloring with organic dyes or iodine. Polyvinyl alcohol is one commonly used polymer in this application. However, the low thermal stability of films based on polyvinyl alcohol limits their applications. Polyvinyl alcohol based films are described in greater detail in *Liquid Crystals—Applications and Uses*, B. Bahadur, ed., Vol. 1, World Scientific, Singapore, N.Y. Jul. 1990, p101. It is desirable to develop improved methods of forming anisotropic films with the characteristics of greater heat resistance and more convenient synthesis and film formation.

Organic dichroic dyes are a new class of materials currently gaining prominence in the manufacture of optically anisotropic films with desirable optical and working characteristics. Films based on these materials are formed by coating a liquid crystal (LC) aqueous solution of supramolecules formed by dye molecules on a substrate surface following water evaporation. The produced films are imbued with anisotropic properties either by preliminary mechanical ordering of the underlying substrate surface as described in U.S. Pat. No. 2,553,961 or by applying external mechanical, electromagnetic, or other orienting forces to the coating on a liquid crystal substrate material as described in pending PCT Application No. WO 94/28073.

Liquid crystal properties of dye solutions are known in the prior art. However, investigations into their application in this manner is a more recent development in the past several years. Recent studies into-these phenomena have been motivated largely by industrial applications in liquid crystal displays (LCDs) and glazing. Supramolecules form a lyotropic liquid crystal (LLC). Substantial ordering of dye molecules in columns allows use of these mesophases to create oriented, strongly dichroic films. Dye molecules that form supramolecular liquid crystal mesophases are special. They contain functional groups located at a molecule periphery that determine the water solubility of the dye. Organic dye mesophases are characterized by specific structures, phase diagrams, optical properties and dissolving capabilities as described in greater detail in Jean-Marie Lehn, *Supramolecular Chemistry*, N.-Y., 1998.

Anisotropic films characterized by high optical anisotropy may be formed from LLC systems based on dichroic dyes. Such films exhibit both the properties of E-type polarizers, due to light absorption by supramolecular complexes, and the properties of retarders. Retarders are films with phase-retarding properties in those spectral regions where absorption is lacking. Phase-retarding properties of the films are determined by their double refraction properties: different refraction indices in the direction of LC solution deposition and the direction orthogonal to the deposition direction. If high-strength dyes are used for the film formation, the films are also characterized by high thermal and photo stability.

Extensive investigations aimed at developing new methods of creating dye-based films through manipulation of deposition conditions are currently underway. Of additional interest is the development of new compositions of lyotropic liquid crystals (LLC). New LLC compositions may be developed through the introduction of modifying, stabilizing, surfactant and other additives to known dyes, thus improving film characteristics. More detailed discussions of these processes are provided in Russian patent No. RU 2047643 and published PCT patent application No. WO 99/31535.

The requirements for producing anisotropic film with improved selectivity in different wavelength ranges are increasing. Films with different absorbance maxima located in a wide spectral range from the infrared to the ultraviolet are needed in a wide range of technology areas. The requirements have led to development of an expanding assortment of compounds capable of forming LLC phases and films with required properties.

Much recent research attention has been directed to the materials used in the manufacturing of double refraction films (retarders), which are used in LC displays and telecommunications applications, such as, for example, those described by P. Yeh, *Optical Waves in Layered Media*, New York: John Wiley &Sons, Inc, 1998 and P. Yeh, and C. Gu, *Optics in Liquid Crystal Displays*, New York: John Wiley &Sons, Inc., 1999. It has been found that ultra-thin double refraction films may be produced using known technologies to form optically anisotropic films composed of organic dye LLC systems. Recent reports on manufacturing of thin crystalline optically anisotropic films based on disulfoacids of the red dye Vat Red 14 (Lazarev, P. and Paukshto, M., "Thin Crystal Film Retarders," 2000, *Proceeding of the 7th International Display Workshops, Materials and Components*, Kobe, Japan, p. 1159–1160), have identified the mixture of naphthalenetetracarboxylic acid dibenzimidazole cis- and trans-isomers of the following structures:

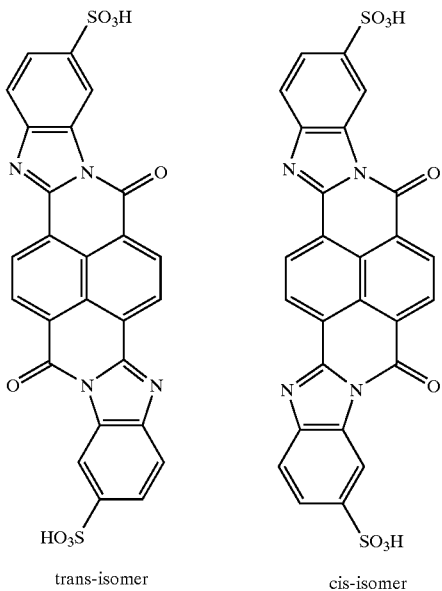

trans-isomer    cis-isomer

The prior art technology permits control of the direction of the crystallographic axis of a film during coating and crystallization on a substrate. Films were formed on glass plates measuring approximately 5 cm by 7.5 cm. The deposited films were uniform in composition and had high a crystal ordering with a dichroic ratio, $K_d$, of approximately 28. These films may be used either as polarizers or as retarders.

Oriented red dye based films typically exhibit high anisotropy characterized by a large difference in the refraction indices: $\Delta n = n_o - n_e$ and falls in the range of approximately 0.6 to 0.8 at wavelengths in the range of approximately $\lambda = 550$ to 700 nm. However, their application is limited, because the films work as retarders only in the green spectral region where the dye does not absorb.

Thin, double refraction films based on sodium chromoglycate (DSCG) with the following structure may also be prepared to be transparent in the visible region:

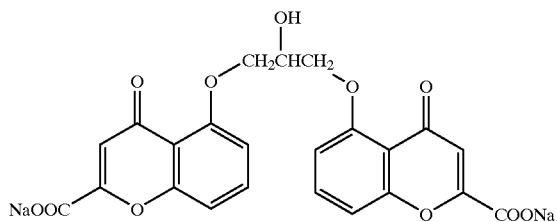

The anisotropy of the oriented film formed from this compound is not very high—the difference in the refraction indices is in the range of approximately 0.1 to 0.13. However, the thickness of films based on DSCG may be varied in a wide range, thus allowing preparation of films with a desired phase-retarding effect despite somewhat low anisotropy. More details on these films are provided by Lazarev, P. and Paukshto, M., "Thin Crystal Film Retarders" (2000), *Proceeding of the 7th International Display Workshops, Materials and Components,* Kobe, Japan, p. 1159–1160. The main disadvantage of these films lies in their dynamic instability which leads to gradual recrystallization and anisotropy degradation.

Various blends based on water-soluble organic dyes used for forming anisotropic films according to described above technology are known in the prior art. Examples are described in published PCT patent applications No. WO 94/28073 and No. WO 99/31535. However, the main drawback of these materials is their high absorbance in the visible spectral region which limits their application for forming transparent double refraction films.

SUMMARY OF THE INVENTION

It is an object of the present invention to provide a series of new chemical compounds, namely phenanthro-9',10':2,3-quinoxaline sulfoderivatives capable of forming stable lyotropic liquid crystals and producing anisotropic, at least partially crystalline films based on these compounds. The present invention is further directed to expansion of the assortment of compounds that are either not absorbing or only weakly absorbing in the visible spectral region and that are capable of forming a LLC phase with enhanced stability for producing anisotropic, at least, partially crystalline films with high optical characteristics at simultaneous elimination of mentioned above drawbacks.

One embodiment of the present invention provides a method of producing slightly-colored films that may be used both for polarizing and for double-refraction. Phenanthro-9',10':2,3-quinoxaline and its derivatives do not have as developed a π-electron conjugation system as do other known dichroic dyes, and they therefore absorb in the UV and near visible spectral regions. Thus, the molecule of unsubstituted phenanthro-9',10':2,3-quinoxaline has an absorption maximum at $\lambda \approx 390$ nm.

Another embodiment of the present invention provides LLC phases with enhanced stability over broad concentration, temperature and pH ranges. These LLC phases are formed from organic compounds that ease the film formation process, and use standard equipment for coating thereby facilitating production of films with reproducible parameters.

Yet another aspect of the present invention provides organic compound mixtures in which the optimal hydrophilic-hydrophobic balance is realized. This in turn affects the size and shape of the resultant supramolecular complexes and the molecular ordering rate in the complex itself, thus allowing attainment of the required solubility of the considered compounds. Proper solubility values promote high stability of the produced LLC phases. Reproducibility of the formed film parameters is enhanced in this manner, and thereby the film formation process is eased by reducing the requirements for choosing and controlling technological conditions at different stages of the film formation. Furthermore, the optical performance of the produced films is improved by increased uniformity of alignment on a substrate of the planes of phenanthro-9',10':2,3-quinoxaline sulfoderivative molecules. In addition, the dipole moments of electronic transitions with respect to direction lie in these planes and are determined by external orienting stresses.

BRIEF DESCRIPTION OF THE DRAWINGS

Other objects and advantages of the present invention will become apparent upon reading the detailed description of the invention and the appended claims provided below, and upon reference to the drawings, in which:

DETAILED DESCRIPTION OF THE INVENTION

Figure 1:
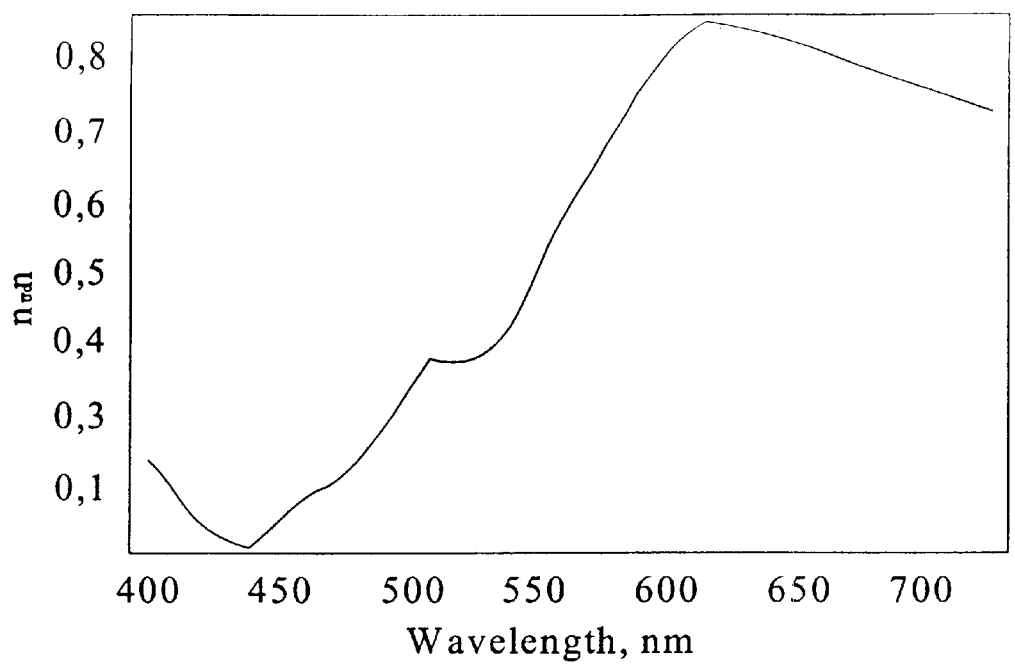
FIG.-1 is an absorbance spectrum illustrating the spectral dependence of the anisotropy order for a film formed from sulfonated naphthalenetetracarboxylic acid dibenzimidazole.

The present invention is directed to creation of compounds that are either not absorbing or only weakly absorbing in the visible spectral region and that are capable of forming a LLC phase with enhanced stability for producing anisotropic, at least partially crystalline films with high optical characteristics.

The water-soluble compounds of the present invention—phenanthro-9',10':2,3-quinoxaline sulfoderivatives—provide the solution for the above indicated problems, are original, and are not described in the literature. These compounds, according to the invention, are represented by the general structural formula:

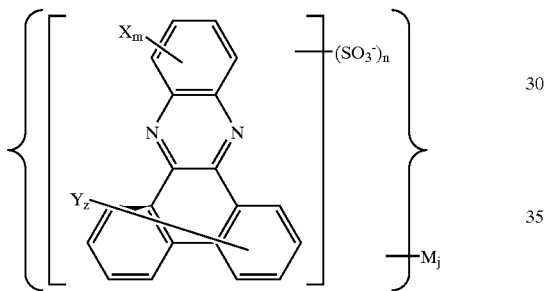

where n is an integer in the range of 1 to 4, m is an integer in the range of 0 to 4, and z is an integer in the range of 0 to 6 subject to the restriction that $m+z+n \leq 12$; X and Y are individually selected from $CH_3$, $C_2H_5$, $OCH_3$, $OC_2H_5$, Cl, Br, OH, $NH_2$; M is a counterion; and j is the number of counterions in a dye molecule. In the case of one counterion belonging to several molecules, j may be a fraction. If n is greater than 1, the counterions may be different. Compounds corresponding to this structural formula comprise a whole class of structures differing by the number and positions of sulfo groups, as well as number, positions and character of other substituents as shown in Examples I–VIII:

I

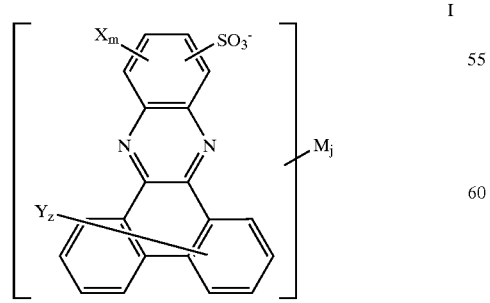

where m is an integer in the range of 0 to 3 and z is an integer in the range of 0 to 6

II

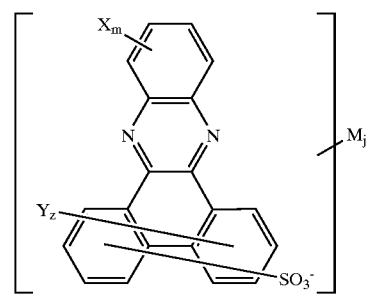

where m is an integer in the range of 0 to 4 and z is an integer in the range of 0 to 6

III

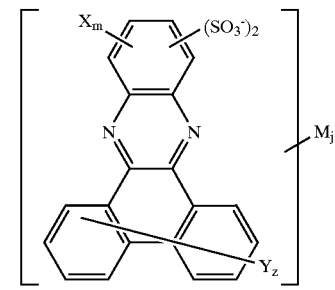

where m is an integer in the range of 0 to 2 and z is an integer in the range of 0 to 6

IV

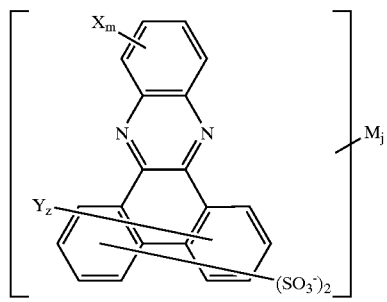

where m is an integer in the range of 0 to 4 and z is an integer in the range of 0 to 6

V

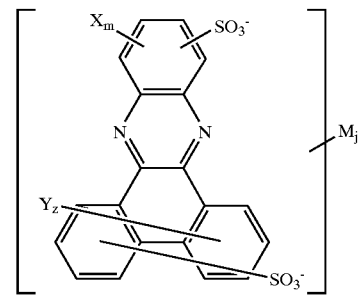

where m is an integer in the range of 0 to 3 and z is an integer in the range of 0 to 6

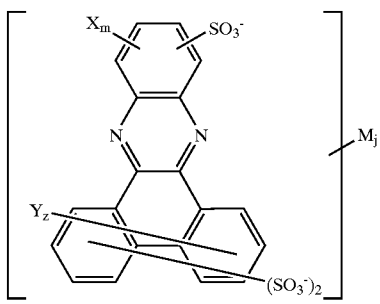

VI where m is an integer in the range of 0 to 3 and z is an integer in the range of 0 to 6

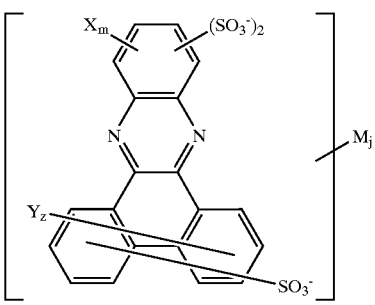

VII where m is an integer in the range of 0 to 2 and z is an integer in the range of 0 to 6

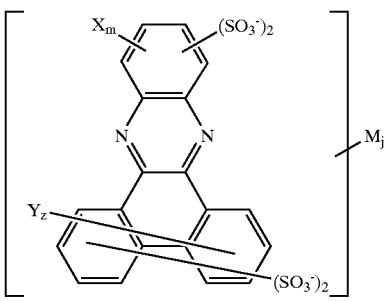

VIII where m is an integer in the range of 0 to 2 and z is an integer in the range of 0 to 6 and where X and Y are individually selected from the group consisting of $CH_3$, $C_2H_5$, $OCH_3$, $OC_2H_5$, Cl, Br, OH, and $NH_2$, M is a counterion, and j is the number of counterions in a dye molecule. In the case of one counterion belonging to several molecules, j may be fractional. If the number of sulfo groups is greater than 1, the individual counterions may be different.

All of compounds I—VIII in individual form, as well as when blended with each other or with other known dichroic dyes and also in mixtures with some organic compounds that do not absorb strongly in the visible region, are capable of forming stable LLC phases. After solvent removal, the resultant LLC phase may form partially crystalline anisotropic films with high optical characteristics. Various cations, including for instance those selected from $H^+$, $NH_4^+$, $K^+$, $Li^+$, $Na^+$, $Cs^+$, $Ca^{++}$, $Sr^{++}$, $Mg^{++}$, $Ba^{++}$, $Co^{++}$, $Mn^{++}$, $Zn^{++}$, $Cu^{++}$, $Pb^{++}$, $Fe^{++}$, $Ni^{++}$, $Al^{+++}$, $Ce^{+++}$, $La^{+++}$ and others a mixtures of cations may be used as counterions in the structures I–VIII described above.

Figure 2:
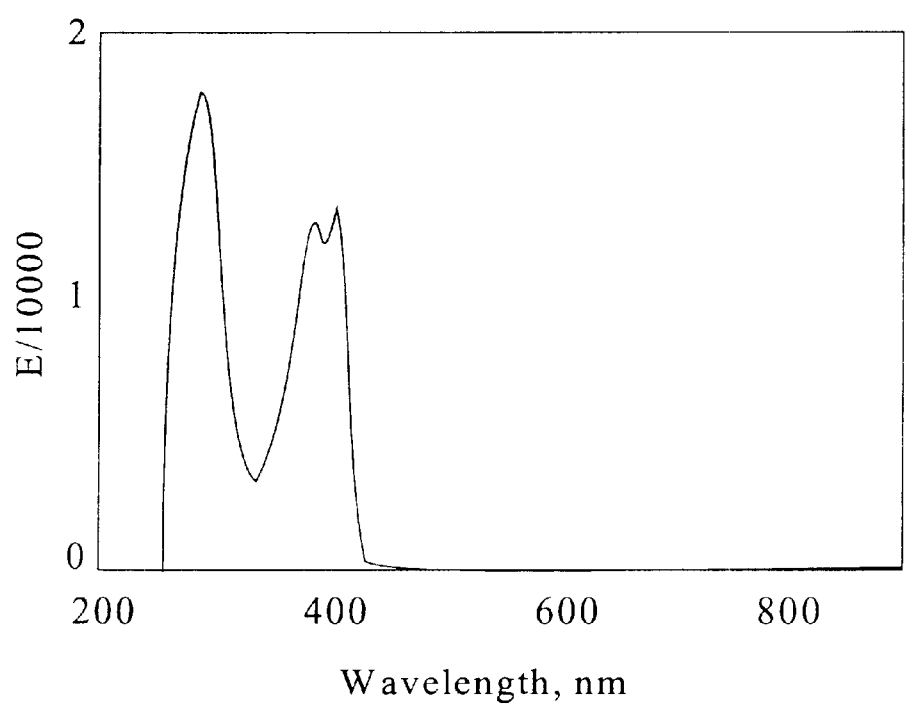
FIG.-2 shows the electron absorption spectrum of phenanthro-9',10':2,3-quinoxaline-2',7'-disulfoacid.

Sulfoderivatives of phenanthro-9',10':2,3-quinoxaline generally have absorption maxima in aqueous solutions in the near UV region at wavelengths of approximately 390 nm (FIG. 2). Introduction of such substituents as ethyl, methyl, chlorine, and bromine does not generally cause considerable absorption band shift, compared to the molecule without substituents. Introduction of amino and hydroxy substituent groups results in absorption band broadening and changes the spectrum character. Varying the number of sulfo groups and/or the number and character of substituents in phenanthro-9',10':2,3-quinoxaline allows modification of both the hydrophilic-hydrophobic balance of the aggregates in a LC solutions and their viscosity. Any combination of parameters and numbers of substituents specified above will result in creation of a film according to the parameters of the present invention.

The advantages of the present invention are ensured by using a phenanthro-9',10':2,3-quinoxaline sulfoderivative of the general structures disclosed herein. LC systems based on these compounds are used to produce optically anisotropic films. The phenanthro-9',10':2,3-quinoxaline sulfoderivative contains at least one of the structural formulas I–VIII discussed above.

The phenanthro-9',10':2,3-quinoxaline sulfoderivatives of the present invention are capable of forming stable LLC systems. These phenanthro-9',10':2,3-quinoxaline sulfoderivatives are intended for manufacturing optically isotropic or anisotropic films. In addition, the phenanthro-9',10':2,3-quinoxaline sulfoderivatives provided by the present invention are intended for producing at least partially crystalline films as well as for forming polarizing and/or double-refraction films. The phenanthro-9',10':2,3-quinoxaline sulfoderivatives described herein may also be included in a composition of the material of an optically isotropic or an anisotropic polarizing and/or phase-retarding film. An exemplary composition of such an optically isotropic or anisotropic film includes at least two compounds of group I–VIII disclosed above and/or at least two compounds of at least one structure of group I–VIII with at least two different substituents.

An advantage of the present invention is that the LLC system is a water-based ink composition containing an individual phenanthro-9',10':2,3-quinoxaline sulfoderivative corresponding to any of the exemplary disclosed structures (I–VIII) disclosed herein, or mixtures of the same. Such a LLC system according to one embodiment of the present invention system is a mixture of water and organic dye miscible with water at any ratios or restrictedly miscible with water. In an exemplary LLC system, the content of phenanthro-9',10':2,3-quinoxaline sulfoderivatives or their mixtures lies in the range of approximately 3% to 40% by mass, or more preferably in the range of approximately 7% to 15% by mass. The LLC system may also preferably contain up to approximately 5% of surfactants and/or plasticizers.

In such an LLC system the content of an individual phenanthro-9',10':2,3-quinoxaline sulfoderivative may vary in the following limits depending on the required properties:

1. monosulfoderivatives of formulas I and II with mass concentrations in the range of approximately 0% to 99% and more preferably in a mass concentration range of approximately 50% to 99%;
2. disulfoderivatives of formulas III, IV, and V with mass concentrations in the range of approximately 0 to 99% and more preferably in a mass concentration range of, approximately 50% to 99%;

3. trisulfoderivatives of formulas VI and VII with mass concentrations in the range of approximately 0% to 30% and more preferably in a mass concentration range of, approximately 10% to 20%; or
4. tetrasulfoderivatives of formula VIII with mass concentrations in the range of approximately 0% to 20% and more preferably in a mass concentration range of, approximately 5 to 10%

The LLC system may additionally contain at least one water-soluble organic dye or colorless organic compound capable of participating in LLC phase formation. Alternatively, the LLC system may additionally contain at least two compounds from structures I–VIII disclosed above and/or at least two compounds of at least one structure from I–VIII with at least two different substituents.

The above described combinations realize the technical objectives of the present invention by yielding anisotropic films containing individual phenanthro-9',10':2,3-quinoxaline sulfoderivatives corresponding to any of claimed I–VIII structures and/or the mixtures of these compounds.

The anisotropic film may additionally contain another organic dye or colorless organic compound. Additionally, the anisotropic film may be formed by depositing a LLC system corresponding to those disclosed herein onto the substrate, applying an orienting force and drying. The anisotropic film is preferably at least partially crystalline.

In an alternative embodiment of the present invention, a film material containing at least two compounds from a range I–VIII and/or at least two compounds of at least one structure from a range I–VIII with at least two different substituents is provided.

In an alternative embodiment of the present invention, a method is provided for producing phenanthro-9',10':2,3-quinoxaline sulfoderivatives of the general structural formulas I–VIII shown above. Sulfoderivatives of the general formula X are formed at sulfonation of phenanthro-9',10':2,3-quinoxaline or its derivatives IX with sulfuric acid or oleum at different concentrations in different temperature ranges as follows:

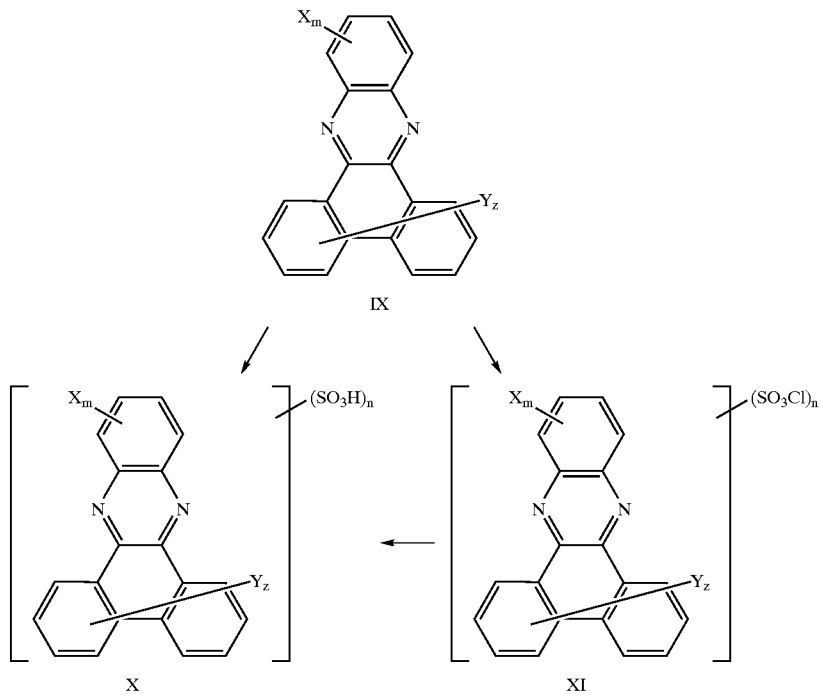

where n is an integer in the range of 1 to 4, m is an integer in the range of 0 to 4, z is an integer in the range of 0 to 6, and the equation m+z+n≦12 is satisfied; and X and Y are individually selected from $CH_3$, $C_2H_5$, $OCH_3$, $OC_2H_5$, Cl, Br, OH, and $NH_2$.

Sulfoderivatives of a general formula X may be synthesized via hydrolysis of the corresponding derivatives XI formed via sulfonation of a compound of general formula IX with chlorosulfonic acid and its mixtures with oleum of different concentrations. Sulfonation of phenanthro-9',10':2,3-quinoxaline and its derivatives may be conducted in a sulfonating agent medium, as well as in an organic solvent medium. In addition, phenanthro-9',10':2,3-quinoxaline sulfoderivatives may be produced by phenanthrenequinone or its derivatives, for instance formula XII, condensation with o-phenylenediamine or its derivatives (formula XIII) as shown below, provided that at least one initial compound contains one or several sulfo groups as substituents.

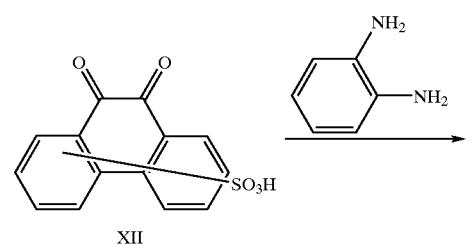

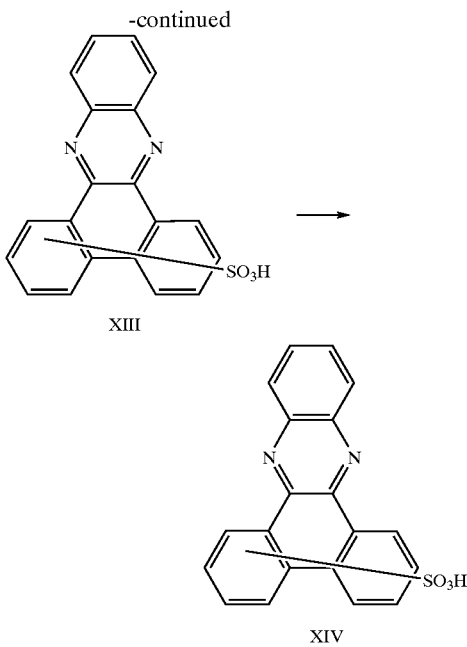

Individual phenanthro-9',10':2,3-quinoxaline sulfoderivatives may also be produced by fractionation of their mixtures, using fractional precipitation from solutions.

When dissolved in water, the molecules of phenanthro-9',10':2,3-quinoxaline sulfoderivatives of general structure I–VIII and/or mixtures thereof form anisometric (rod-like) agglomerates in which molecules are packed in a parallel manner, much like a deck of playing cards. Each such aggregate in aqueous solution represents a micelle having a double electric layer, and the solution is a highly dispersed (colloidal) lyophilic system. As the concentration of micelles in solution increases, natural ordering of the anisometric aggregates proceeds, leading to nematic lyotropic mesophase formation as the system becomes liquid crystalline. The concentration at which the transition to a LC state occurs depends on the ratio of phenanthro-9',10':2,3-quinoxaline sulfoderivatives which lies in the range of approximately 3% to 50% by mass. The LC state is easily fixed with standard methods, such as for example polarization microscopy.

LC solutions (systems) of individual phenanthro-9',10':2,3-quinoxaline sulfoderivatives with structures I–VIII, as well as their mixtures, may be deposited on a substrate surface and aligned on it using any known method, such as for example those disclosed in WO 94/28073 and WO 00/25155, the disclosures of which are hereby incorporated by reference in their entirety. For example, the desired molecular orientation may be obtained by applying shear stress, or gravitational or electromagnetic fields. For better substrate surface wetting and improvement of LC solution rheological properties, a solution may be doped with modifying additives, such as for example plasticizing water-soluble polymers and/or anion-active or nonionic surfactants. Low-molecular weight water-soluble compounds may alternatively be used. Such additives are chosen from those compounds that do not destroy the alignment of a LC solution. Upon solvent removal from the oriented film, an anisotropic polycrystalline film with a thickness of approximately 0.2 to 1.2 microns is formed. The difference of refraction indices along and across the film in the visible spectral region between approximately 380 nm and 900 nm is in the range of approximately 0.1 to 0.8. Such characteristics are achieved for the known polymer retarders at a film thickness of about 200 microns. Thus, the efficiency of double-refraction films based on the present invention is approximately 100–200 times higher than what is achievable using previously known materials and methods.

The phenanthro-9',10':2,3-quinoxaline sulfoderivatives of the present invention are capable of forming a LLC system that facilitates manufacturing of slightly-colored anisotropic films characterized by improved optical parameters.

EXPERIMENTAL

A number of experiments were conducted according the method and system of the present invention. These experiments are intended for illustration purposes only, and are not intended to limit the scope of the present invention in any way.

EXAMPLE 1

Phenanthro-9',10':2,3-quinoxaline-2'-sulfoacid was synthesized by sulfonation of phenanthro-9',10':2,3-quinoxaline. 3.0 g of phenanthro-9',10':2,3-quinoxaline were stirred in 20 ml of 10% oleum for 1.5 hour at 60° C. Then the reaction mixture was diluted with 70 ml of water. The formed precipitate is filtered, washed with hydrochloric acid to remove $SO_4^{-2}$ ions, and dried at 100° C. The process yielded 2.6 g of phenanthro-9',10':2,3-quinoxaline-2'-sulfoacid.

PMR-spectrum results were as follows: (Bruker AC-300, DMSO) δ, p.p.m.: 9.55 (singlet, 1H), 9.30 (doublet, 1H), 8.78 (multiplet, 2H), 8.30 (doublet of doublets, 2H), 8.10 (doublet, 1H), 8.0 (multiplet, 4H). Infrared spectrum (IR-Fourier spectrometer FSM-1201, film on the windows KRS-5) peaks were located at 1027, 1164, and 1247 cm$^{-1}$ ($SO_3H$); 1625 cm$^{-1}$ (CN, CCN). The electron spectrum (spectrometer Ocean PC 2000, aqueous solution) of the sample had $\lambda_{max1}$=284 nm, and $\lambda_{max2}$=392.6 nm. Elemental analysis measured C, 66.61; 66.13; H, 3.27; 3.06 N, 7.81; 7.88; S, 9.02; 9.11. $C_{20}H_{12}N_2O_3S$. Calculated values were C, 66.65; H, 3.36; N, 7.77; O, 13.32; S, 8.90.

EXAMPLE 2

Phenanthro-9',10':2,3-quinoxaline-2',7'-disulfoacid was synthesized by sulfonation of phenanthro-9',10':2,3-quinoxaline. 3.0 g of phenanthro-9',10':2,3-quinoxaline were stirred in 20 ml of 10% oleum for 10 hours at 90–95° C. Then the reaction mixture was diluted with water in amount determined to obtain a 50% sulfuric acid solution. The formed precipitate was filtered, washed with hydrochloric acid to remove $SO_4^{-2}$ ions, and dried at 100° C. The synthesis yielded 3.8 g of phenanthro-9',10':2,3-quinoxaline-2',7'-disulfoacid.

PMR-spectrum results were as follows: (Bruker AC-300, DMSO) δ, p.p.m.: 8.0 (multiplet, 2H), 8.1 (doublet of doublets, 2H); 8.4 (multiplet,2H), 8.8 (doublet, 2H), 9.6 (doublet, 2H). Infrared spectrum (IR-Fourier spectrometer FSM-1201, film on the windows KRS-5) peaks were located at 1039, 1189, and 1235 cm–$^1$ ($SO_3H$); 1634 cm–$^1$ (CN, CCN). The electron spectrum (spectrometer Ocean PC 2000, aqueous solution) of the sample had $\lambda_{max1}$=284.5 nm, and $\lambda_{max2}$=392.6 nm. Elemental analysis measured C, 54.39; 54.48; H, 2,75; 2,68; N, 6.46; 6,39; S, 14.68; 14.72. $C_{20}H_{12}N_2O_6S_2$ Calculated values were C, 54.54; H, 2.75; N, 6.36; O, 21.80; S, 14.56.

EXAMPLE 3

Phenanthro-9',10':2,3-quinoxaline-2'-sulfoacid was synthesized by condensation of o-phenylenediamine with 2-sulfophenanthrenequinone. 2.3 g of 2-sulfophenanthrenequinone and 1,0 g of o-phenylenediamine were boiled in 50 ml of acetic acid for 8 hours. Then the reaction mixture was cooled to 15° C. The formed precipitate was filtered, washed with 15° C. acetic acid, and dried. The synthesis yielded 2.4 g of phenanthro-9',10':2,3-quinoxaline-2'-sulfoacid—identical to the compound synthesized in Example 1. A similar method may be used for producing phenanthro-9',10':2,3-quinoxaline sulfoderivatives with different substituents.

EXAMPLE 4

A composition and film were produced according to the present invention and analyzed to determine the film's optical characteristics. 12 g of phenanthro-9',10':2,3-quinoxaline-2',7'-disulfoacid were introduced with stirring at a temperature 20° C. into 65.0 g of deionized water. Then, 5.3 ml of 25% aqueous ammonia solution were added and the mixture stirred to complete dissolution. 10 g of 1% sulfanol solution were added to the resultant solution, and the mixture is thoroughly stirred. The yield was 92 g of 13% LC solution. The solution was coated onto a glass plate surface with a Meyer rod No23 at a linear rate of 25 mm s$^{-1}$, a temperature of 20° C., and a relative humidity of 65%. The film was dried at the same humidity and temperature.

Figure 3A:
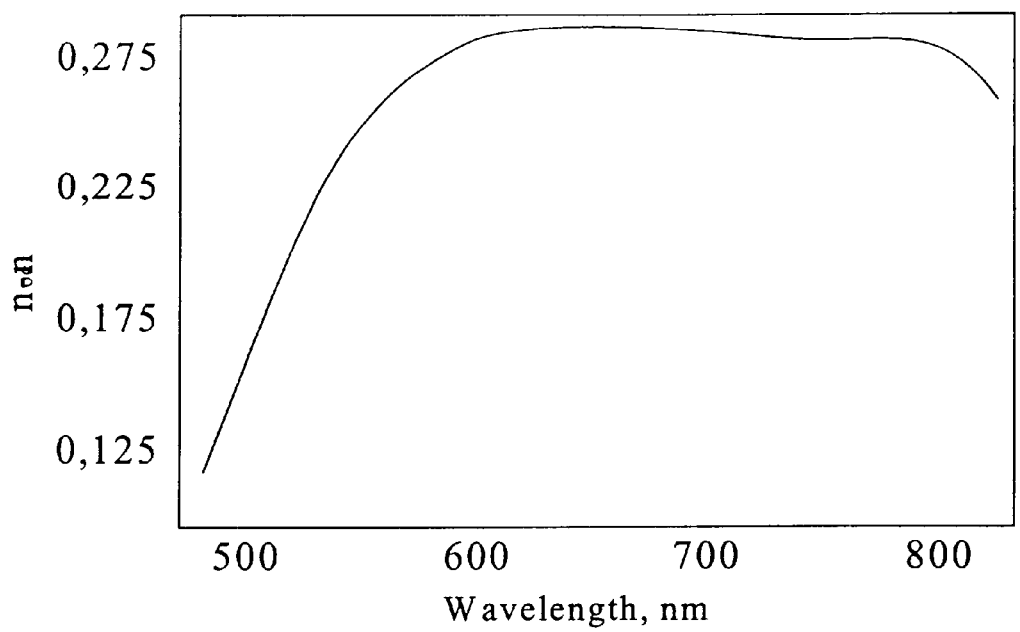
FIG.-3a is an absorbance spectrum illustrating the dependence of the refraction indices on wavelength for a film formed from phenanthro-9',10':2,3-quinoxaline-2',7'-disulfoacid.
Figure 3B:
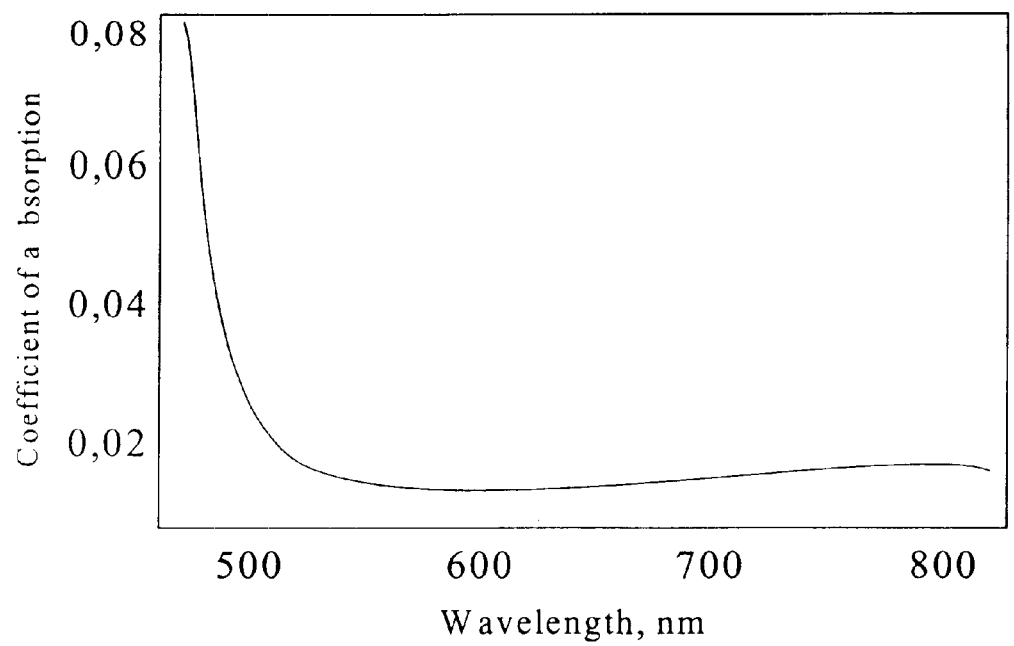
FIG.-3b is an absorbance spectrum illustrating the dependence of the absorption coefficients on wavelength for a film formed from phenanthro-9',10':2,3-quinoxaline-2',7'-disulfoacid.

To determine optical characteristics of the film, sample transmittance spectra were measured in polarized light in the wavelength range of approximately 400 to 800 nm with the incident beam polarization plane oriented both parallel and perpendicular to the solution deposition direction, as well as at 30° to the polarization normal, using a Cary-500 spectrophotometer. The obtained data were used to calculate refraction indices ($n_o$, $n_e$) and absorption coefficients ($k_o$, $k_e$) parallel and perpendicular to the solution deposition direction according to the known procedure (P. Lazarev, N. Ovchinnikova, and M. Paukshto, "Submicron Thin Retardation Coating", SID'01 DIGEST, San Jose, Calif., June 2001, Vol. XXXII, p. 571.). The calculated coefficients for the film formed from phenanthro-9',10':2,3-quinoxaline-2',7'-disulfoacid are presented in FIG. 3. The produced film is optically anisotropic, has good phase-retarding properties as shown in FIG. 3a, good polarization characteristics in the wavelength range of approximately 400 to 450 nm, and very low absorbance in the visible spectral region above approximately 500 nm as shown in FIG. 3b.

What is claimed is:

1. A phenanthro-9',10':2,3-quinoxaline sulfoderivative of the general structural formula:

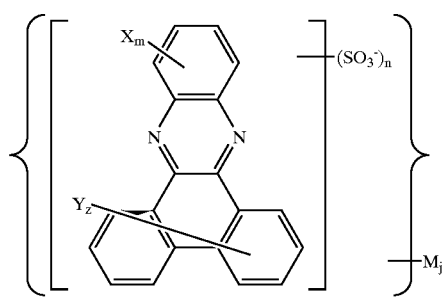

where n is an integer in the range of 1 to 4;
m is an integer in the range of 0 to 4;

z is an integer in the range of 0 to 6, and m+z+n≦12;

X and Y are individually selected from the group consisting of $CH_3$, $C_2H_5$, $OCH_3$, $OC_2H_5$, Cl, Br, OH, and $NH_2$;

M is a counterion; and j is the number of counterions in a dye molecule.

2. The phenanthro-9',10':2,3-quinoxaline sulfoderivative of claim 1 wherein the structural formula is chosen from

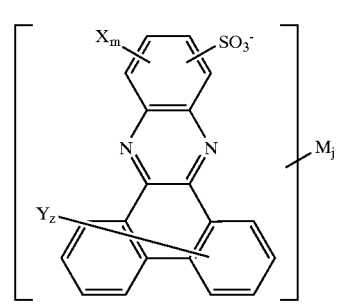

where m is an integer in the range of 0 to 3, and z is an integer in the range of 0 to 6;

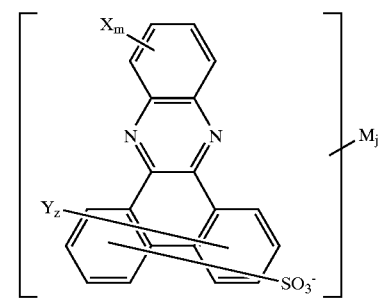

where m is an integer in the range of 0 to 4, and z is an integer in the range of 0 to 6;

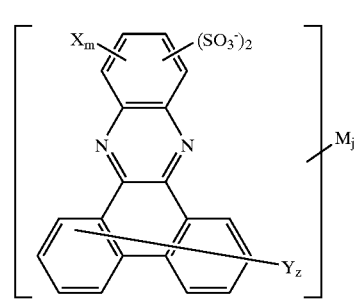

where m is an integer in the range of 0 to 2, and z is an integer in the range of 0 to 6;

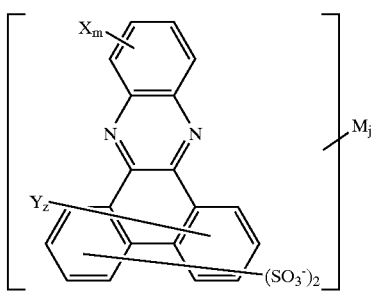

IV where m is an integer in the range of 0 to 4, and z is an integer in the range of 0 to 6;

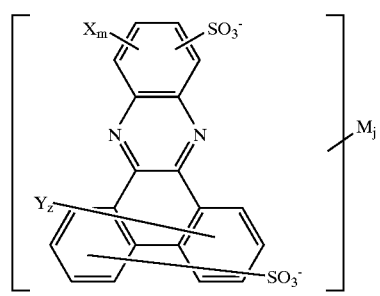

V where m is an integer in the range of 0 to 3, and z is an integer in the range of 0 to 6;

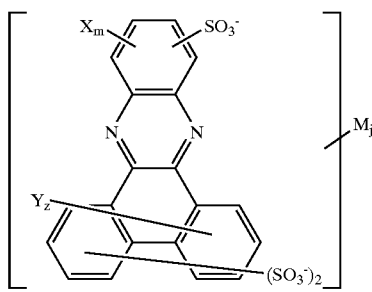

VI where m is an integer in the range of 0 to 3, and z is an integer in the range of 0 to 6;

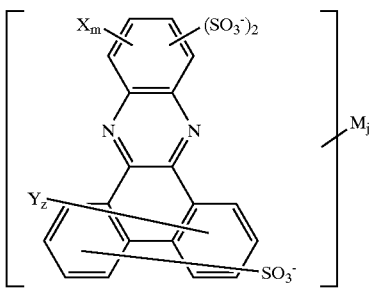

VII where m is an integer in the range of 0 to 2, and z is an integer in the range of 0 to 6; and

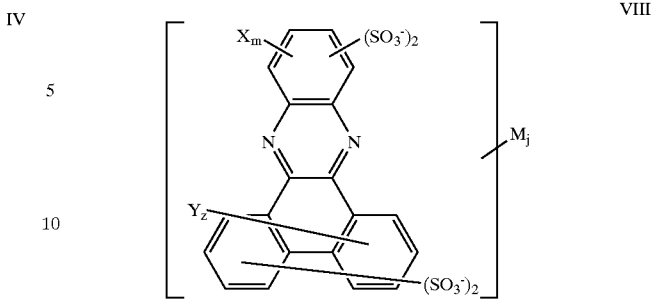

VIII where m is an integer in the range of 0 to 2, and z is an integer in the range of 0 to 6;

and where X, Y are individually selected from the group consisting of $CH_3$, $C_2H_5$, $OCH_3$, $OC_2H_5$, Cl, Br, OH, and $NH_2$, M is a counterion, and j is the number of counterions in a dye molecule.

3. The phenanthro-9',10':2,3-quinoxaline sulfoderivative of claim 1 wherein said derivative is capable of forming a stable lyotropic liquid crystal system.

4. The phenanthro-9',10':2,3-quinoxaline sulfoderivative of claim 1 wherein said derivative is capable of forming optically isotropic or anisotropic films.

5. The phenanthro-9',10':2,3-quinoxaline sulfoderivative of claim 1 wherein said derivative is capable of forming at least partially crystalline films.

6. The phenanthro-9',10':2,3-quinoxaline sulfoderivative of claim 1 wherein said derivative capable of forming double refraction films.

7. The phenanthro-9',10':2,3-quinoxaline sulfoderivative of claim 1 wherein said derivative is applied to a substrate to produce an optically isotropic film.

8. The phenanthro-9',10':2,3-quinoxaline sulfoderivative of claim 2 wherein said derivative is applied to a substrate to produce an optically isotropic film.

9. The phenanthro-9',10':2,3-quinoxaline sulfoderivative of claim 8 comprising at least two compounds of at least one structure selected from the I–VIII structures having at least two different substituents.

10. The phenanthro-9',10':2,3-quinoxaline sulfoderivative of claim 2 wherein said derivative is capable of forming a double refraction film material.

11. The phenanthro-9',10':2,3-quinoxaline sulfoderivative of claim 10 wherein said derivative comprise at least two compounds of the I–VIII structures.

12. The phenanthro-9',10':2,3-quinoxaline sulfoderivative of claim 10 wherein said derivative comprising at least two compounds of at least one structure selected from the I–VIII group having at least two different substituents.

13. A lyotropic liquid crystal system containing at least one phenanthro-9',10':2,3-quinoxaline sulfoderivative of claim 1.

14. The lyotropic liquid crystal system of claim 13 wherein said lyotropic liquid crystal system is based on a mixture of water and an organic solvent miscible with water.

15. The lyotropic liquid crystal system of claim 13 wherein the content of phenanthro-9',10':2,3-quinoxaline sulfoderivatives is in the range of approximately 3% to 40% by mass.

16. The lyotropic liquid crystal system of claim 13 wherein the content of phenanthro-9',10':2,3-quinoxaline sulfoderivatives is in the range of approximately 7% to 15% by mass.

17. The lyotropic liquid crystal system of claim 13 further comprising up to approximately 5% by mass of surfactants.

18. The lyotropic liquid crystal system of claim 13 further comprising up to approximately 5% by mass of plasticizers.

19. A lyotropic liquid crystal system containing at least one phenanthro-9',10':2,3-quinoxaline sulfoderivative of claim 2.

20. The lyotropic liquid crystal system of claim 19 further comprising at least one water-soluble organic compound capable of forming a common lyotropic liquid crystal system with at least one phenanthro-9',10':2,3-quinoxaline sulfoderivative of structure I to VIII.

21. The lyotropic liquid crystal system of claim 19 comprising a mixture of phenanthro-9',10':2,3-quinoxaline sulfoderivatives wherein monosulfoderivatives of structures I and II are present in a concentration range of approximately 0% to 99% by mass;

disulfoderivatives of structures III, IV, and V are present in a concentration range of approximately 0% to 99% by mass;

trisulfoderivatives of structures VI and VII are present in a concentration range of approximately 0% to 30% by mass; and tetrasulfoderivatives of a structure VIII are present in a concentration range of approximately 0% to 20%.

22. The lyotropic liquid crystal system of claim 21 comprising a mixture of phenanthro-9',10':2,3-quinoxaline sulfoderivatives wherein monosulfoderivatives of structures I and II are present in a concentration range of approximately 50% to 99% by mass;

disulfoderivatives of structures III, IV, and V are present in a concentration range of approximately 50% to 99% by mass;

trisulfoderivatives of structures VI and VII are present in a concentration range of approximately 10% to 20% by mass; and tetrasulfoderivatives of a structure VIII are present in a concentration range of approximately 1% to 10%.

23. The lyotropic liquid crystal system of claim 19 comprising at least two compounds of at least one structure selected from I to VIII and having at least two different substituents.

24. An optically anisotropic film comprising at least one phenanthro-9',10':2,3-quinoxaline sulfoderivative of claim 1.

25. The optically anisotropic film of claim 24 further comprising at least one other organic compound.

26. The optically anisotropic film of claim 24 wherein said film is formed by depositing a lyotropic liquid crystal system according to claim 13 onto a substrate, applying orienting force and drying.

27. The optically anisotropic film of claim 24 wherein said film is at least partially crystalline.

28. The optically anisotropic film of claim 27 wherein the interplane spacing in a crystal is in the range of approximately 3.1 Å to 3.7 Å along one of the optical axes.

29. An optically anisotropic film comprising at least one phenanthro-9',10':2,3-quinoxaline sulfoderivative of claim 2.

30. The optically anisotropic film of claim 29 comprising at least two phenanthro-9',10':2,3-quinoxaline sulfoderivatives selected from the I–VIII group.

31. The anisotropic film of claim 29 comprising at least two compounds of at least on structure selected from the I to VIII group and having at least two different substituents.

32. The anisotropic film of claim 29 wherein said film is a double refraction film.

33. The anisotropic film of claim 29 wherein said film is polarizing.

34. A method of producing an optically anisotropic film comprising the steps of:

preparing a phenanthro-9',10':2,3-quinoxaline sulfoderivative according to claim 1;

forming a liquid crystal system as a water-based ink solution containing said phenanthro-9',10':2,3-quinoxaline sulfoderivative;

depositing said liquid crystal system on a substrate surface;

applying an orienting force to formed said deposited liquid crystal system into an oriented film; and removing the solvent from said oriented film.

35. The method of claim 34 wherein said orienting force is selected from the group consisting of shear stress, a gravitational field, and an electromagnetic field.

36. The method of claim 34 further comprising the step of doping said solution with one or more modifying additives that do not destroy the alignment of said liquid crystal system.

37. The method of claim 36 wherein said one or more modifying additives are selected from the group consisting of plasticizing water-soluble polymers, anion active surfactants, nonionic surfactants, and low molecular weight water-soluble compounds.

38. A method of producing an optically anisotropic film comprising the steps of:

preparing at least one phenanthro-9',10':2,3-quinoxaline sulfoderivative according to claim 2;

forming a liquid crystal system as a water-based ink composition containing said phenanthro-9',10':2,3-quinoxaline sulfoderivatives;

depositing said liquid crystal system on a substrate surface;

applying an orienting force to formed said deposited liquid crystal system into an oriented film; and removing the solvent from said oriented film.

39. The method of claim 38 wherein said orienting force is selected from the group consisting of shear stress, a gravitational field, and an electromagnetic field.

40. The method of claim 38 further comprising the step of doping said solution with one or more modifying additives that do not destroy the alignment of said liquid crystal system.

41. The method of claim 40 wherein said one or more modifying additives are selected from the group consisting of plasticizing water-soluble polymers, anion active surfactants, nonionic surfactants, and low molecular weight water-soluble compounds.

* * * * *

(12) EX PARTE REEXAMINATION CERTIFICATE (6114th)
United States Patent
Sidorenko et al.

(10) Number: US 6,583,284 C1
(45) Certificate Issued: Feb. 5, 2008

(54) ANISOTROPIC FILMS BASED ON SULFODERIVATIVES OF PHENANTHRO-9' 10':2-3-QUINOXALINE AND LYOTROPIC LIQUID CRYSTAL SYSTEMS AND METHOD FOR MAKING

(75) Inventors: Elena N. Sidorenko, Moscow (RU); Tatiana Ya. Dutova, Moscow (RU)

(73) Assignee: Nitto Denko Corporation, Shimohozumi, Ibaraki, Osaka (JP)

Reexamination Request:
No. 90/007,924, Feb. 13, 2006

Reexamination Certificate for:
Patent No.: 6,583,284
Issued: Jun. 24, 2003
Appl. No.: 10/300,422
Filed: Nov. 19, 2002

Related U.S. Application Data

(60) Provisional application No. 60/402,026, filed on Aug. 7, 2002.

(51) Int. Cl.
*C09K 19/34* (2006.01)

(52) U.S. Cl. .................. 544/342; 252/299.62; 349/1; 349/182

(58) Field of Classification Search ............... None
See application file for complete search history.

(56) References Cited

PUBLICATIONS

Ruggli, von Paul et al., "Uber ortho–Disazo– und o,o'–Trisazo–farbstoffe", Helvetica Chimica Acta, Verlag Helvetica Chimica Acta, Basel, CH, vol. 17, pp. 973–992, XP009021305.

Werner, "Beitrag zuer .Chemie des Phenanthrens", Justus Liebigs Annaten der Chemie, Weinheim, DE, vol. 321, 1902, pp. 336–357, XP001156461.

*Primary Examiner*—Evelyn Huang

(57) ABSTRACT

Anisotropic films based on sulforderivatives of phenanthro-9',10':2,3-quinoxaline are disclosed. These compounds form liquid crystal and lyotropic liquid crystal systems that exhibit excellent optical properties with films that are significantly thinner than the current state of the art. The liquid crystal systems may be deposited on substrates or other film materials for use in a wide variety of commercial applications.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 9, 12, 16–18, 22–41 is confirmed.

Claims 1–8, 10–11, 13–15 and 19–21 are cancelled.

* * * * *